United States Patent
Yau et al.

(10) Patent No.: US 8,255,467 B1
(45) Date of Patent: Aug. 28, 2012

(54) DEVICE MANAGEMENT AND SHARING IN AN INSTANT MESSENGER SYSTEM

(75) Inventors: Herman Yau, Palo Alto, CA (US); Song Yao, Belmont, CA (US)

(73) Assignee: Seedonk, Inc.

( * ) Notice: Subject to any disclaimer, the term of this patent is extended or adjusted under 35 U.S.C. 154(b) by 417 days.

(21) Appl. No.: 12/316,393

(22) Filed: Dec. 13, 2008

(51) Int. Cl.
*G06F 15/16* (2006.01)

(52) U.S. Cl. .......... 709/206; 725/37; 725/105; 715/733; 715/781

(58) Field of Classification Search .......... 709/206, 709/223; 348/222.1; 725/109; 463/42; 705/51; 715/781

See application file for complete search history.

(56) References Cited

U.S. PATENT DOCUMENTS

| 7,917,439 | B2* | 3/2011 | Barnes, Jr. .................... 705/51 |
| 2004/0003073 | A1* | 1/2004 | Krzyzanowski et al. ..... 709/223 |
| 2005/0137015 | A1* | 6/2005 | Rogers et al. .................. 463/42 |
| 2008/0091782 | A1* | 4/2008 | Jakobson ....................... 709/206 |
| 2009/0086048 | A1* | 4/2009 | Jiang et al. ................. 348/222.1 |
| 2009/0100484 | A1* | 4/2009 | Chaiwat et al. .............. 725/109 |
| 2009/0249244 | A1* | 10/2009 | Robinson et al. ............. 715/781 |

* cited by examiner

*Primary Examiner* — Dustin Nguyen
(74) *Attorney, Agent, or Firm* — James Cai; Schein & Cai LLP

(57) ABSTRACT

A system and method for providing device management and sharing in an Instant Messenger system is provided. An instant messenger server and an enhanced instant messenger module are operatively coupled together. The enhanced instant messenger module has an instant messenger process and a networked device process, the instant messenger process being operable to provide instant messaging functions and services to a user and the networked device process being operable to provide data from networked devices to the instant messenger server.

9 Claims, 13 Drawing Sheets

DEVICE MANAGEMENT AND SHARING IN AN INSTANT MESSENGER SYSTEM

BACKGROUND OF THE INVENTION

1. Field of the Invention

The present invention generally relates to Instant Messenger (IM) systems and more particularly to a system and method for providing device management and sharing in an IM system.

2. Description of Related Art

IM systems are well known in the art. Exemplary IM systems include America Online's Instant Messenger (AIM) system, Yahoo! Messenger from Yahoo! and MSN Messenger from Microsoft Corporation. Known IM systems accommodate the use of a webcam for use during an IM session to provide a video-conferencing feature.

Disadvantageously, known IM systems do not provide a facility for assigning webcams and other devices associated with the IM session an identity such that such devices can be accessed and managed outside of the IM session. Thus known IM systems do not support device management and the sharing of devices outside of the IM session.

There therefore exists a need in the art for a facility within an IM system that provides for device management and sharing.

SUMMARY OF THE INVENTION

The present invention provides for device management and sharing in an IM system by allowing for the registration of devices as networked devices having identities separate from an IM session. Such networked devices are maintained separately from a user login session and the networked devices can be accessed by those with access rights outside of a user login session. The networked devices can be registered using a user friendly name such as "My backyard camera" and have their own status separate from that of their owners.

Hierarchical relationships between owners and networked devices are maintained and the owner of a networked device may assign access rights to the networked device. Those users having access rights to a networked device may perform functions of the accessed network device such as viewing video from a networked webcam, changing the configuration of the networked webcam, and performing webcam pan/tilt operations.

Device management and sharing in the IM system in accordance with the invention also includes support for networked device connectivity. Thus a networked webcam can transmit video data to a networked storage device in a different location for the purpose of recording the transmitted video data.

In accordance with one aspect of the invention, a device management and sharing system for use in an instant messaging system comprises an instant messenger server; and an enhanced instant messenger module operatively coupled to the instant messenger server, the enhanced instant messenger module having an instant messenger process and a networked device process, the instant messenger process being operable to provide instant messaging functions and services to a user and the networked device process being operable to provide data from networked devices to the instant messenger server.

In accordance with another aspect of the invention, a computer-implemented method for device management and sharing in an instant messenger system comprises the steps of providing a means by which a first user associates a first device with the first user during an instant messenger session; providing a means by which the first user associates the first device with a second user during the instant messenger session; and providing a means by which the second user accesses the first device during an instant messenger session.

In accordance with yet another aspect of the invention, computer-implemented method for device management and sharing in an instant messenger system comprises the steps of providing a means by which a first user associates a first device with the first user during an instant messenger session; providing a means by which the first user associates the first device with a second user during the instant messenger session; providing a means by which the second user accesses the first device during an instant messenger session; and providing a means by which the data output of the first device is captured.

There has been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended herein.

In this respect, before explaining at least one embodiment of the invention in detail, it is to be understood that the invention is not limited in its application to the details of components and to the arrangements of these components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DESCRIPTION OF A PREFERRED EMBODIMENT OF THE INVENTION

The present invention will now be described in detail with reference to the drawings, which are provided as illustrative examples of the invention so as to enable those skilled in the art to practice the invention. Notably, the figures and examples below are not meant to limit the scope of the present invention. Where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the components referred to herein by way of illustration.

A preferred embodiment of the invention provides a system and computer-implemented method for device management and sharing in an IM system. The system of the invention may include conventional electronic components operable to execute computer instructions stored in a memory. The system will be described in terms of modules or managers, and processes. These terms are not intended to limit the scope of the invention but are used to provide logical distinctions between various components of the system.

Figure 1:
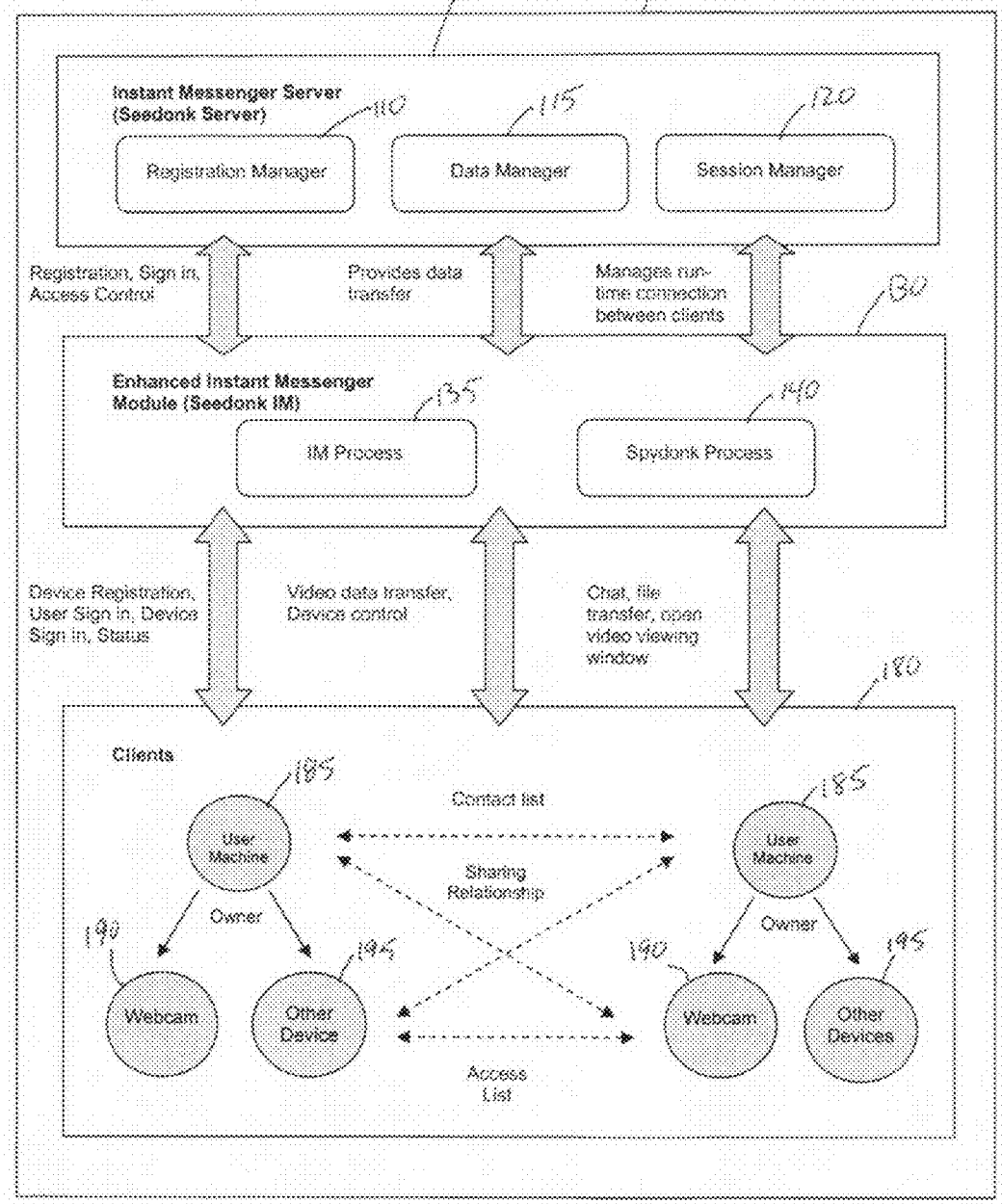
FIG. 1 is a schematic representation of a system for providing device management and sharing in an IM system in accordance with the invention.

With reference to FIG. 1, a system for providing device management and sharing in an IM system 100 includes an IM server 105. IM server 105 may include an electronic computing device having a processing unit, a memory unit, a network unit and a data storage unit (not shown). The IM server 105 includes a registration manager 110, a data manager 115 and a session manager 120.

Registration manager 110 includes a registration facility that provides for user registration including user registration of a new user IM account and user registration of a device as a networked device. Additionally the registration manager 110 is operable to validate user account login information, store user contact list information and store networked device access list information.

Data manager 115 is operable to provide data transfer between users and devices in an IM session. Users and devices in the IM session may include clients 180 such as user machines 185, webcams 190 and other devices 195. As further described below, following registration of a webcam 190 and/or a device 195, the registered device is termed a networked device. Data manager 115 is further operable to provide data transfer between users and networked devices and data transfer between networked devices.

Session manager 120 is operable to facilitate a connection between a user machine 185 in an IM session and another user machine and/or a networked device. Session manager 120 is further operable to maintain the connection, to detect a user or networked device online/offline status and reestablish the connection in the case the connection is lost.

The system 100 also includes an enhanced IM module 130 having an IM process 135 and a Spydonk process 140. The enhanced IM module 130 may have components running on the IM server 105 and components running on the user machines 185. IM process 135 is operable to provide IM functions and services including user login and logout, device registration, adding and removing contacts, chatting, file sharing, networked device sharing, and networked device access.

Spydonk process 140 is a networked device process and is operable to interact with networked devices and provide data from the networked devices to the data manager 115 and to request and review data from the networked devices using network protocols. Spydonk process 140 is also operable to control the settings of a networked device and to control movement of the networked device if the networked device is moveable.

As previously noted, clients 180 include user machines 185, webcams 190 and other devices 195. A user having an account with the system 100 can employ a user machine 185 to access the system 100. The user can then perform actions including registering a device as a networked device, configure the networked device, view the output of a networked device, and share the output of the networked device with contacts. The user can also "Spydonk" the networked device such that the networked device is accessible to other users having access to the networked device even after the user logs off from an IM session.

Webcams 190 include hardware devices operationally coupled to, and logically associated with, a user machine 185. Typical webcams 190 are controlled by a software device driver running on the user machine 185 and provide a video output to the enhanced IM module 130.

Devices 195 may include hardware devices such as a network video recorder (NVR). NVRs are network capable and can be configured to connect to a Local Area Network (LAN) using Ethernet, wireless protocol (such as 802.11g) or other presently known, or subsequently developed, protocol. Devices 195 are operable to perform their various functions within the context of the system 100 and can be commanded from the IM server 105 and/or from a remote user machine 185. Commands include requests for output and other device-specific requests such as data and status requests.

Figure 2:
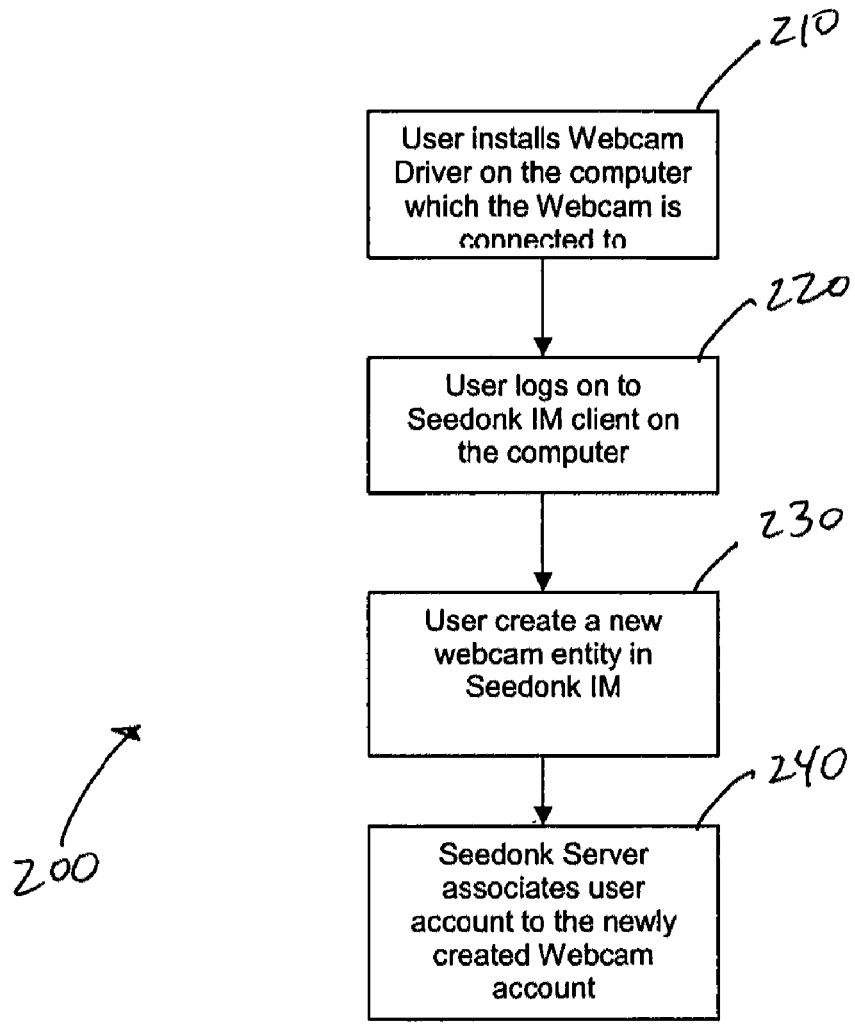
FIG. 2 is a flow chart illustrating a device registration process in accordance with the invention.
Figure 3:
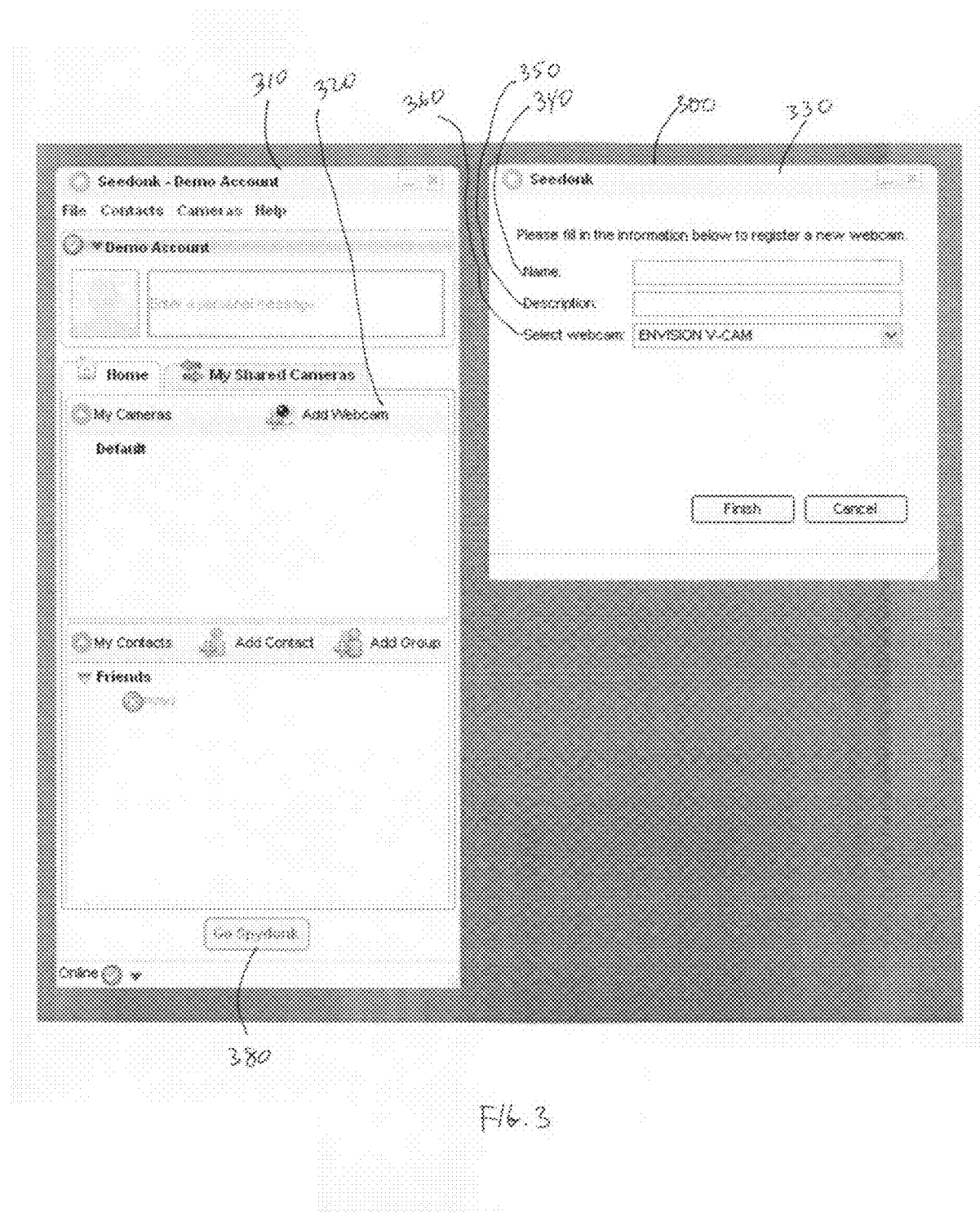
FIG. 3 is a screenshot illustrating the device registration process in accordance with the invention.
Figure 4:
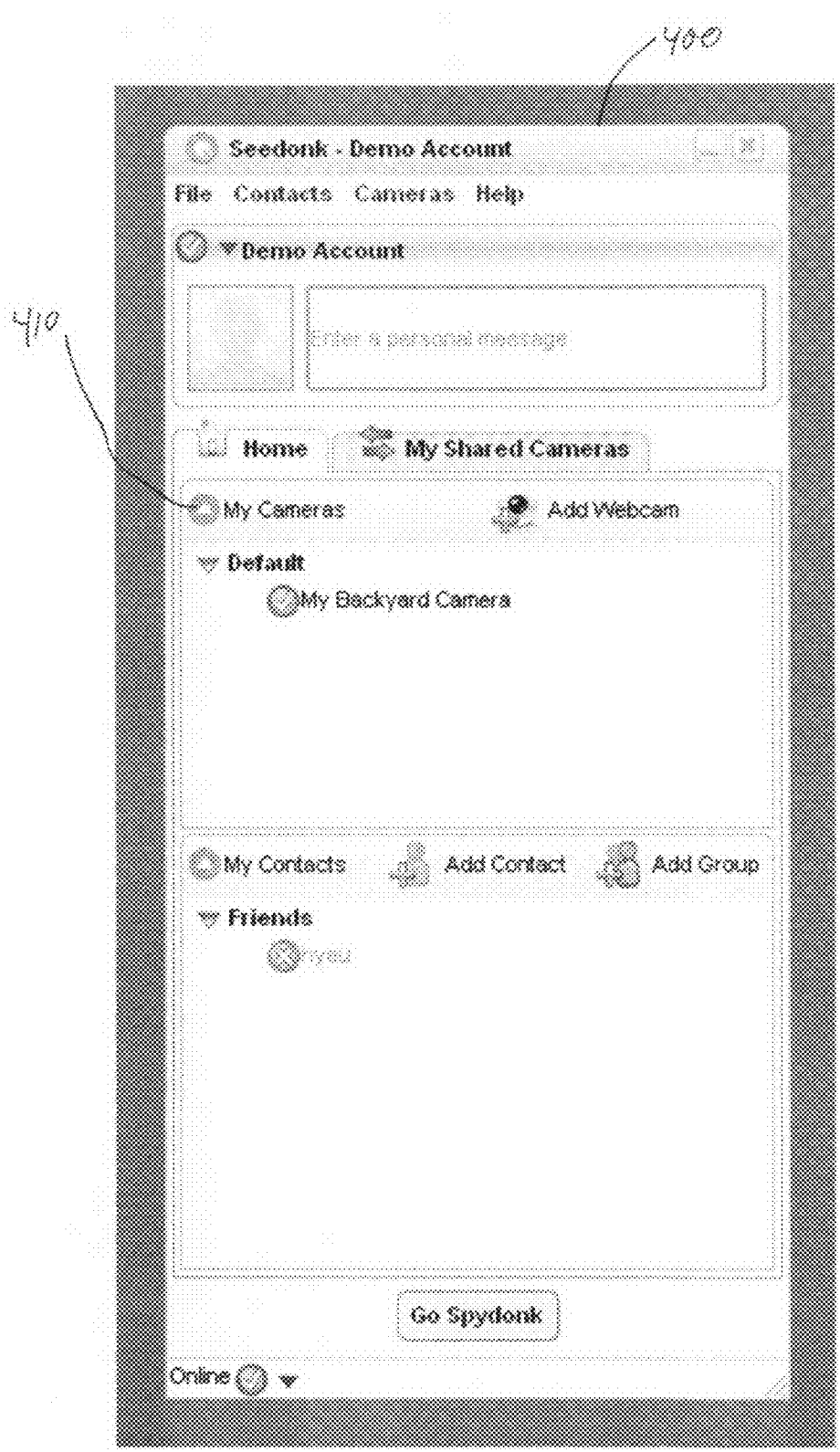
FIG. 4 is a screenshot further illustrating the device registration process in accordance with the invention.

Processes in accordance with the invention include a device registration process 200 illustrated in FIG. 2. Screenshots of a user interface are illustrated in FIGS. 3 and 4. The device registration process 200 includes a step 210 in which a user installs a webcam or other device driver on a user machine 185. In a step 220 the user logs on to the IM server 105 from the user machine 185. A new device account is created using the registration manager 110 in a step 230. The new device account provides an identity to the new device such that the device can be accessed and managed outside of a user IM session. In a step 240, the IM server 105 associates the new device with the user registering the device.

With particular reference to FIGS. 3 and 4, a screenshot 300 illustrates a user interface 310 providing a user with an "Add Webcam" button 320. Clicking the button 320 provides the user with a user interface 330 within which the user can name the new device, provide a description of the new device and select the new device as indicated at 340, 350 and 360 respectively. Following the naming of the new device "My Laptop Webcam", the newly registered device is presented in a user interface 400 in a listing of "My Cameras" 410.

Figure 5:
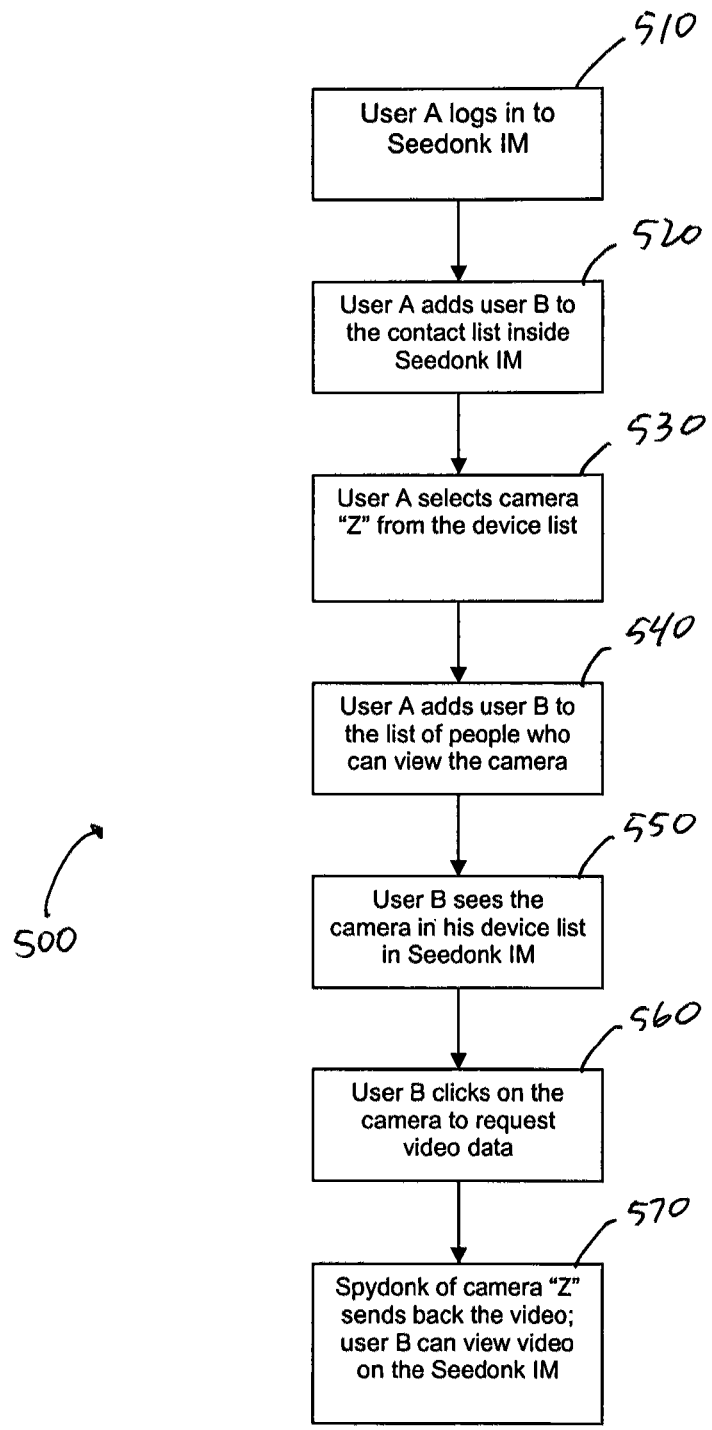
FIG. 5 is a flow chart illustrating a device sharing process in accordance with the invention.
Figure 6:
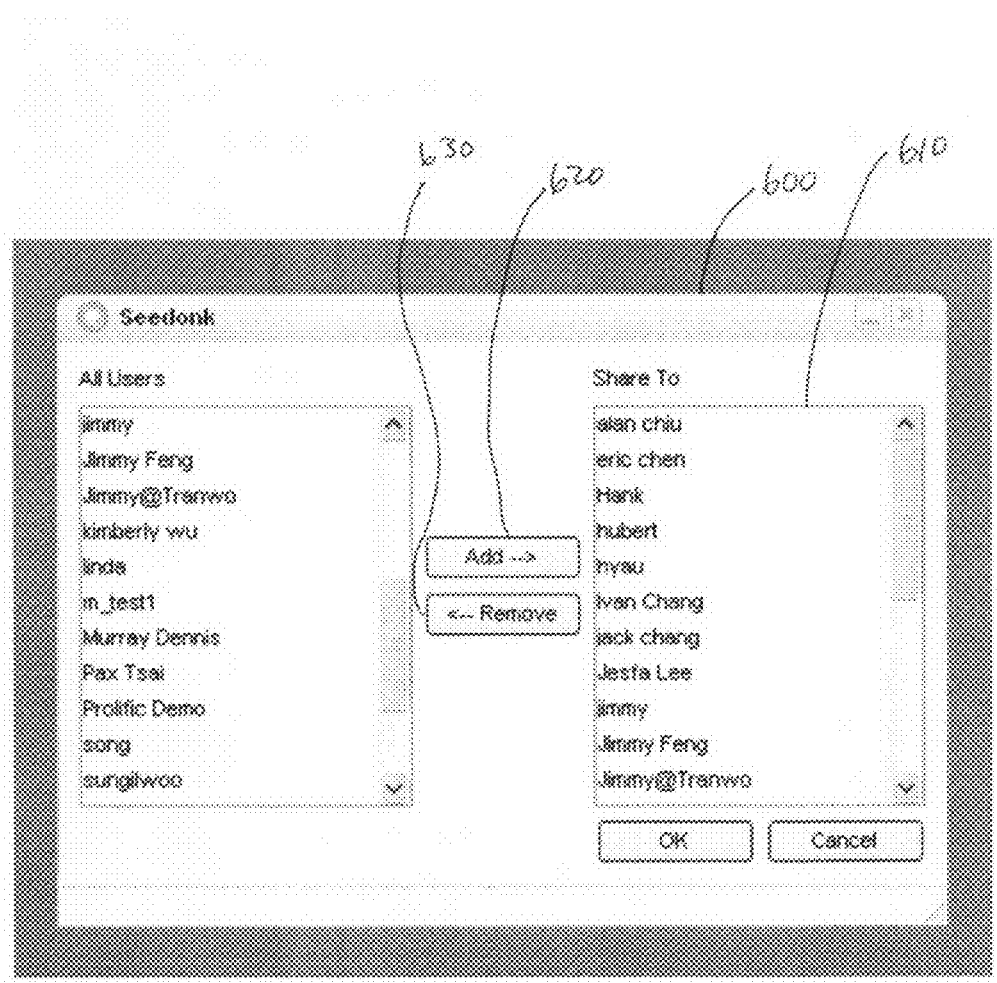
FIG. 6 is a screenshot illustrating the device sharing process in accordance with the invention.
Figure 7:
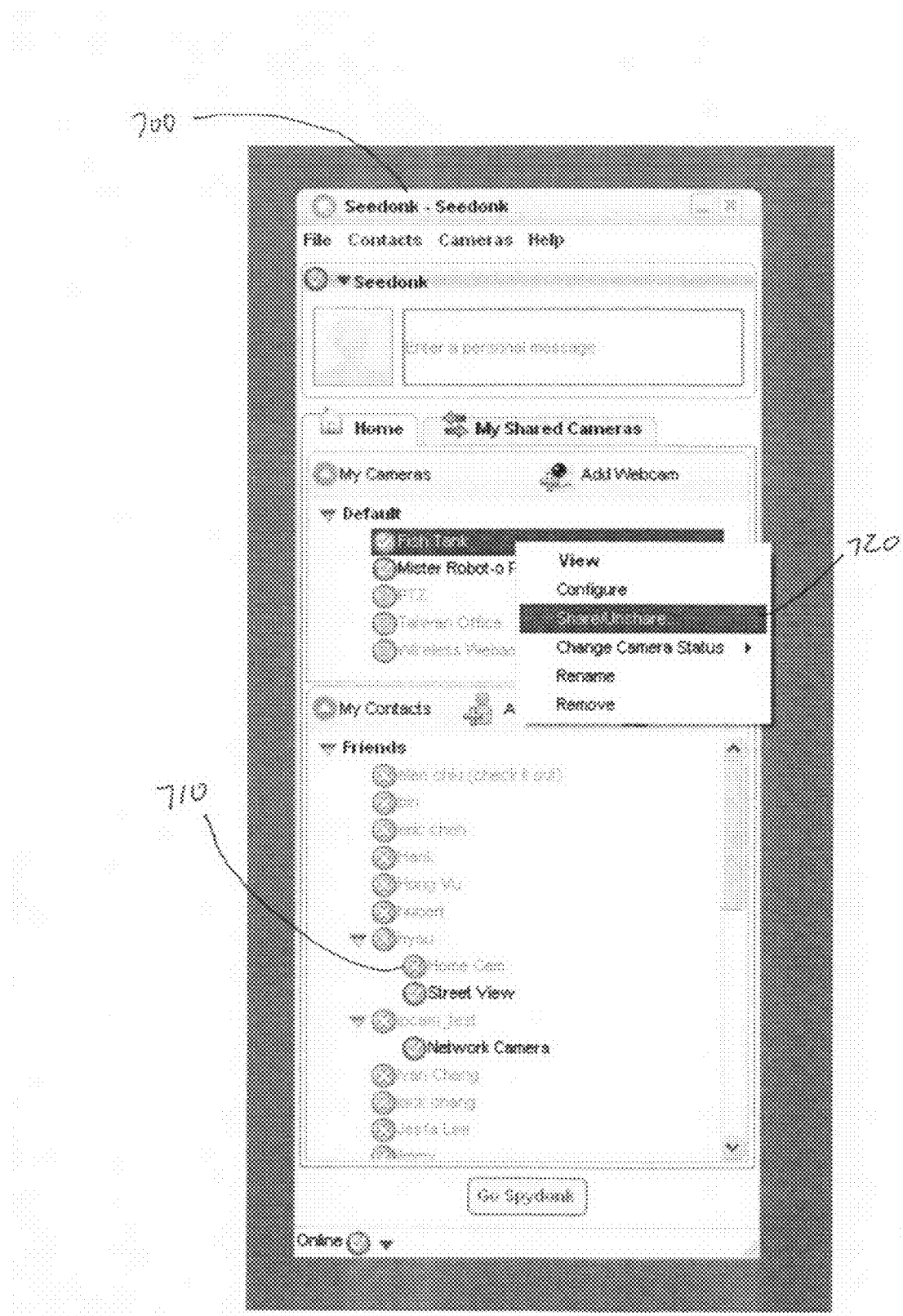
FIG. 7 is a screenshot further illustrating the device sharing process in accordance with the invention.

With reference to FIG. 5, a device sharing process 500 is illustrated. Screenshots 600 and 700 of user interfaces related to the device sharing process 500 are illustrated in FIGS. 6 and 7 respectively. The device sharing process 500 includes a step 510 in which a user logs in to the IM server 105. In a step 520 the user (denoted user A in FIG. 5) may add another user (denoted user B in FIG. 5) to his contact list 610 (FIG. 6). Users may be added and removed by means of "Add" and "Remove" buttons 620 and 630 respectively. In a step 530 user A selects a device from the list of registered devices 710 (denoted camera Z in FIG. 5) associated with user A. In a step 540 access rights to user B are granted allowing access to the selected device Z (hereinafter designated networked device Z). The user granted access rights to the networked device Z (user B) may then view the networked device Z on his device list (not shown) in a step 550. In a step 560 user B may click on a displayed icon of the networked device Z (not shown) to request output of the networked device Z. In a step 570, the Spydonk process 140 running on the networked device Z sends the requested output to the IM server 105 from which user A may access the output on his user machine 185.

Figure 8:
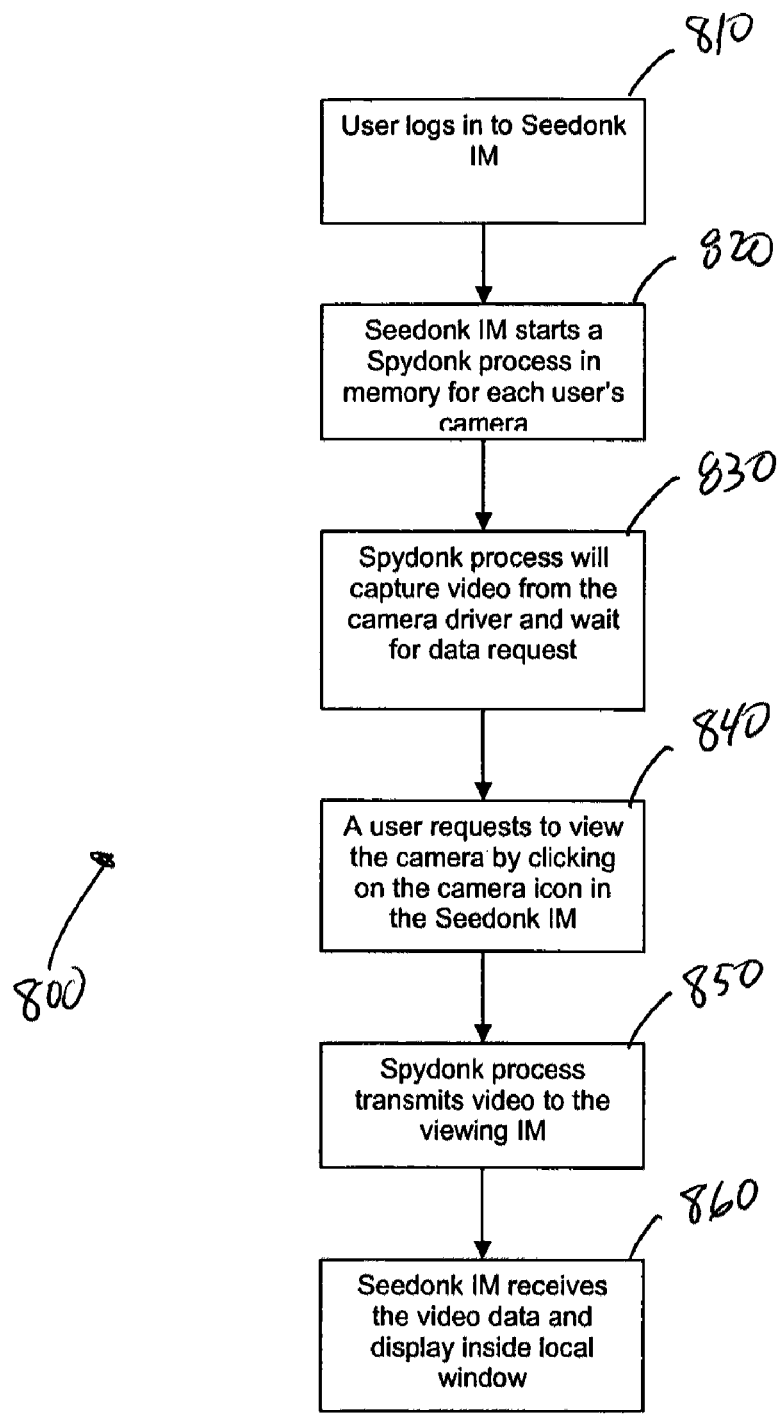
FIG. 8 is a flow chart illustrating a device accessing process in accordance with the invention.
Figure 9:
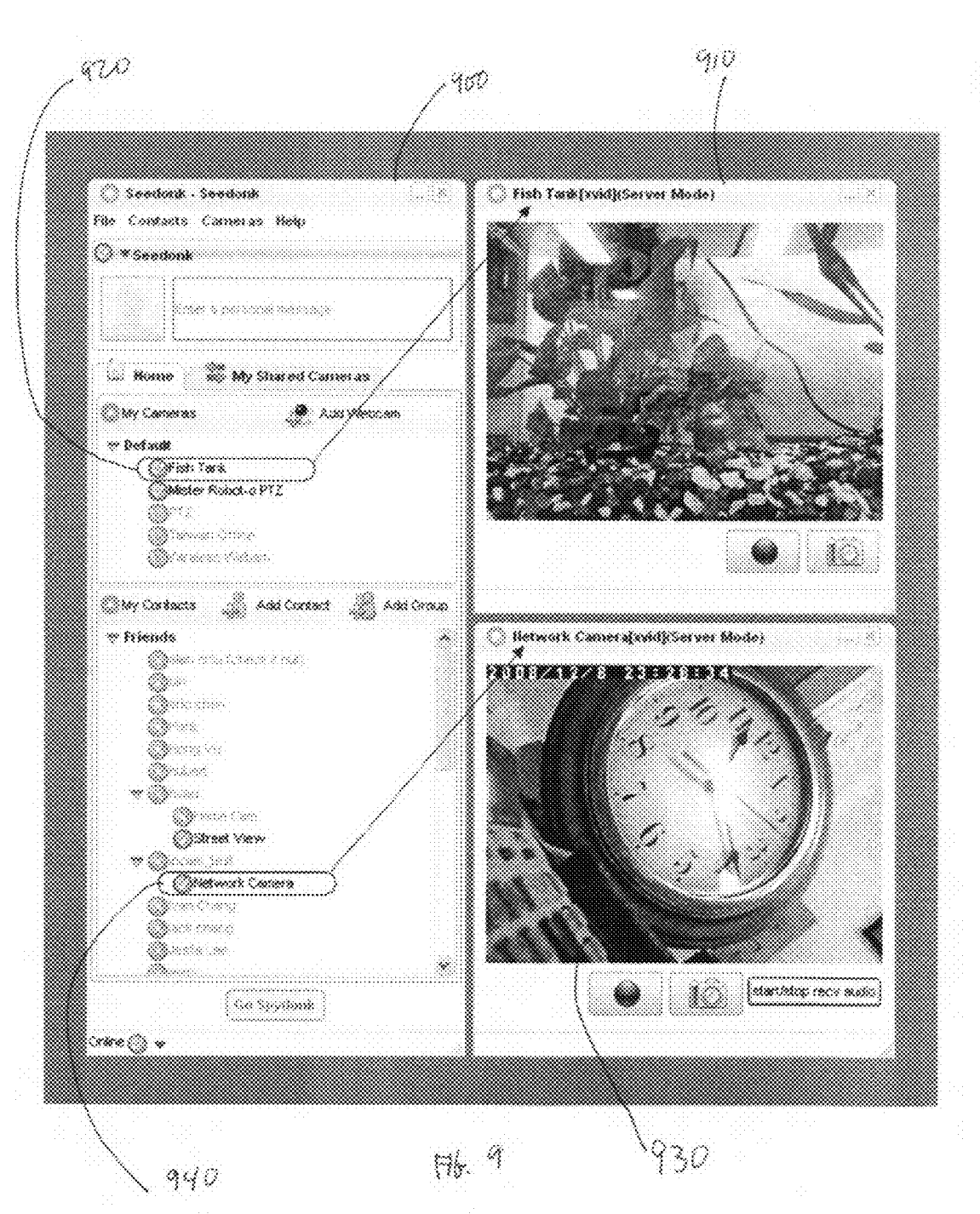
FIG. 9 is a screenshot illustrating the device accessing process in accordance with the invention.

A device accessing process 800 is illustrated in FIG. 8. A screenshot 900 of a user interface related to the device accessing process 800 is illustrated in FIG. 9. In a step 810 a user logs in to the IM server 105. The IM server 105 starts the Spydonk process 140 in each of the networked devices associated with the user in a step 820.

As previously disclosed, the Spydonk process 140 is operable to interact with a networked device and provide data from the networked device to the data manager 115 and to request and review data from the networked device using network protocols. Spydonk process 140 is also operable to control the settings of a networked device and to control movement of the networked device if the networked device is moveable.

In a step 830, the Spydonk process 140 interacts with the networked devices and waits for a data request. A user may request the output of a networked device in a step 840 and in a step 850 the Spydonk process 140 transmits the output to the IM server 105. The user may access the transmitted output in a step 860. Screenshot 900 includes an output 910 of networked device "Fish Tank" 920 and an output 930 of networked device "Network Camera" 940.

Figure 10:
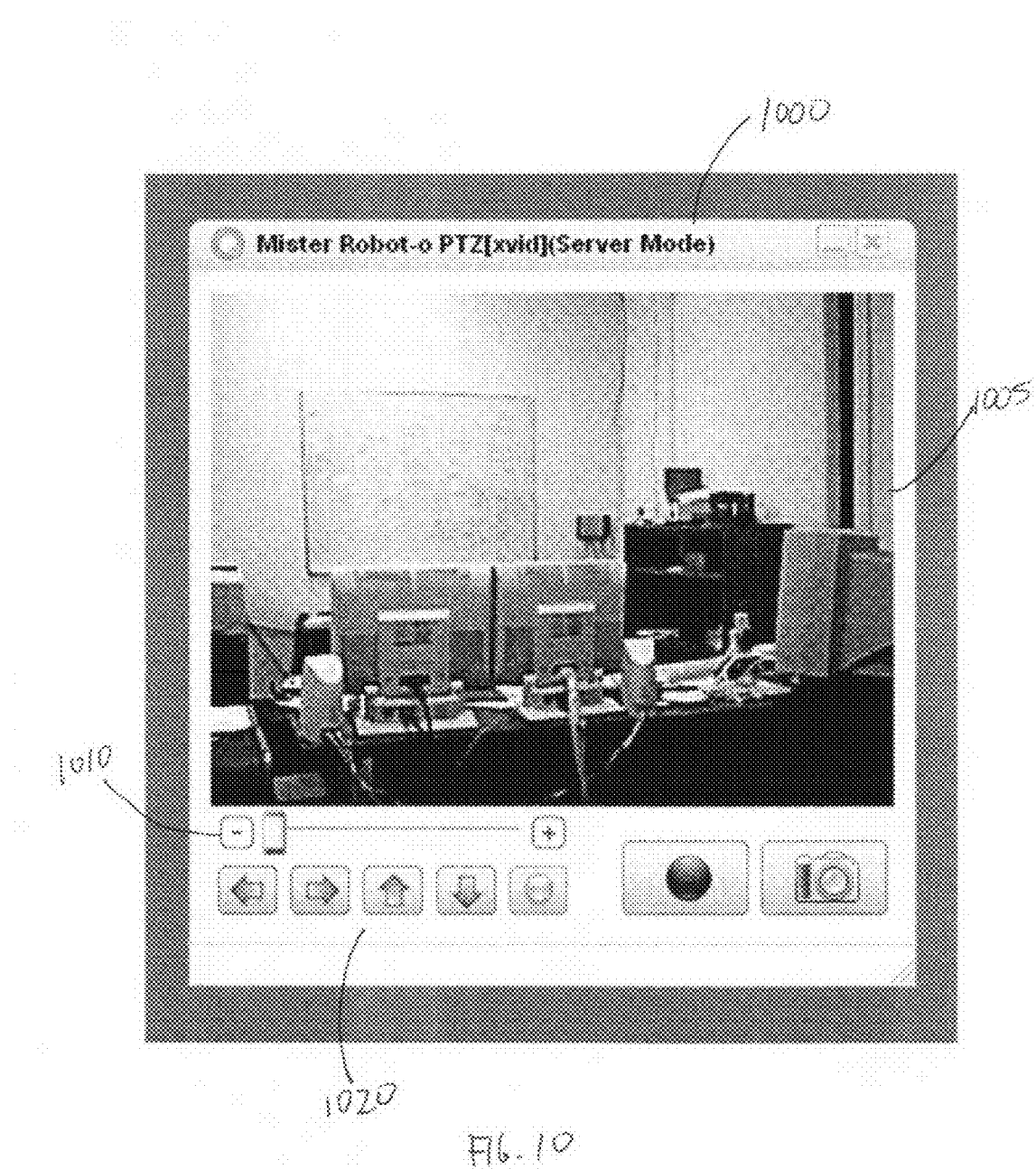
FIG. 10 is a screenshot further illustrating the device accessing process in accordance with the invention.

With reference to FIG. 10, a screenshot 1000 illustrates the movement control of the networked device using the Spydonk process 140 in accordance with the invention. The output of the networked device (video image 1005) can be zoomed by means of control 1010 and panned by means of control 1020.

Figure 11:
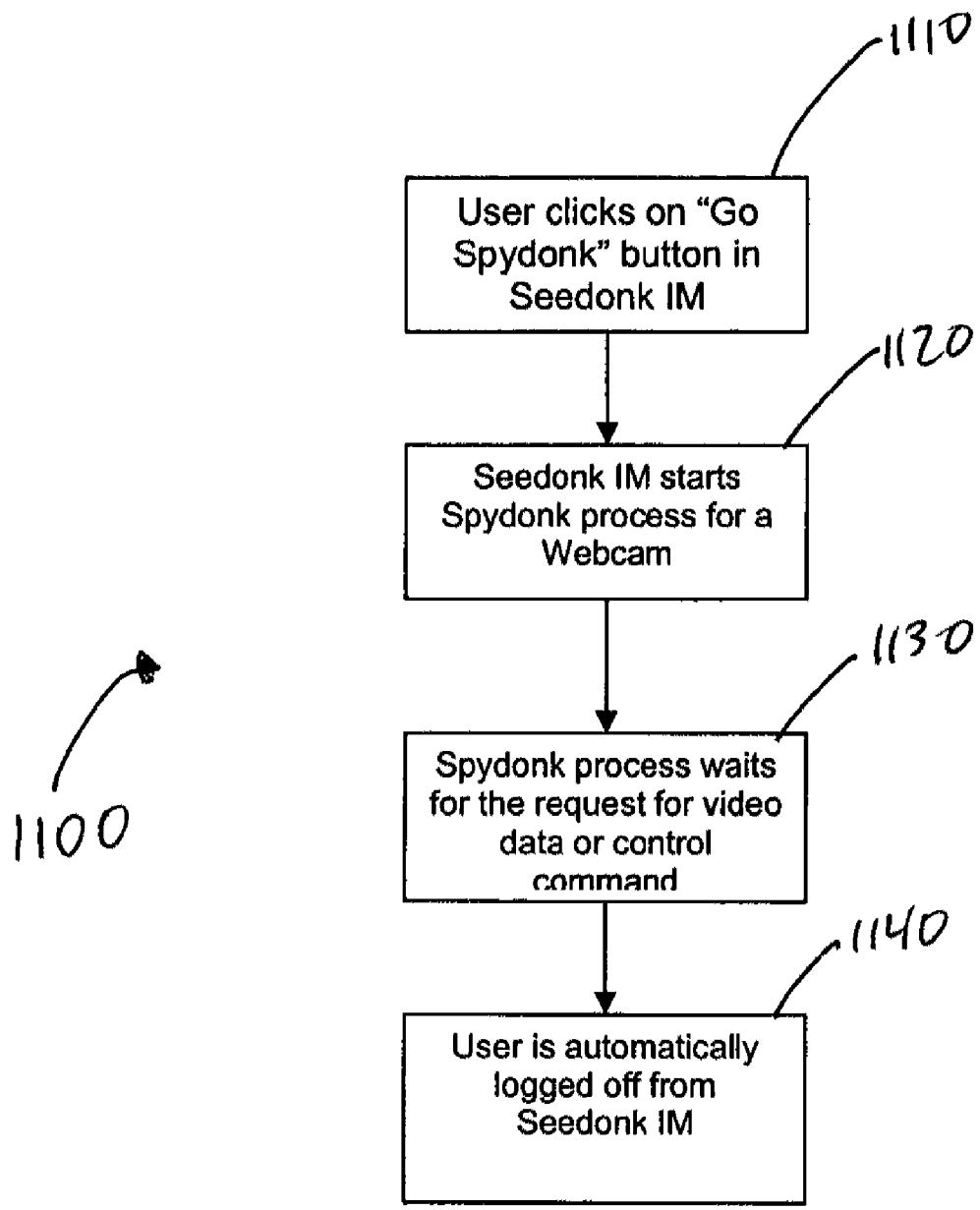
FIG. 11 is a flow chart illustrating a user IM session logoff process in accordance with the invention.
Figure 12:
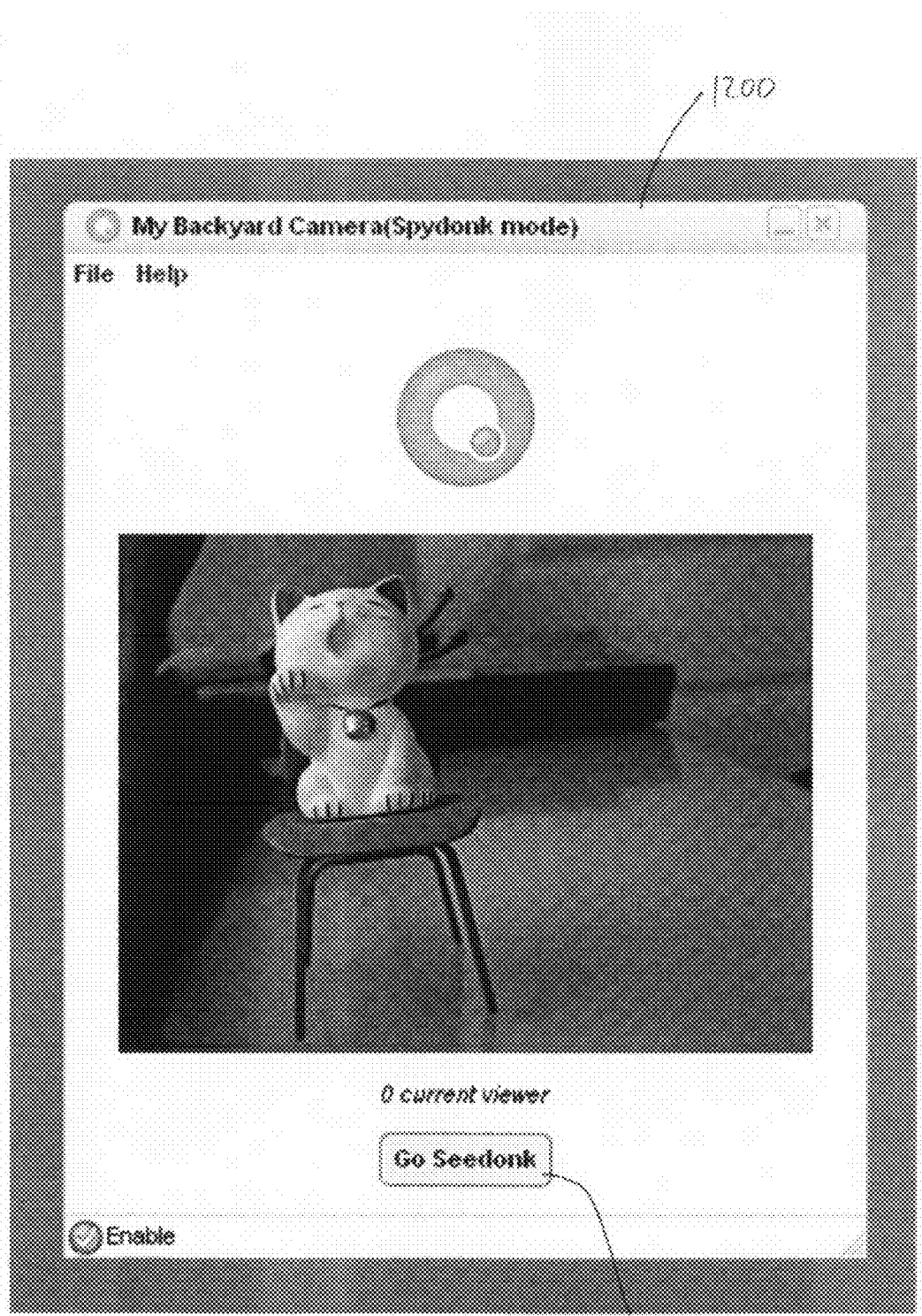
FIG. 12 is a screenshot illustrating the logoff process in accordance with the invention.

Spydonk process 140 is illustrated in FIG. 11 as a method 1100. A screenshot 1200 of a user interface related to the Spydonk process 800 is illustrated in FIG. 12. In a step 1110 the user selects a "Go Spydonk" button such as the button 380 illustrated in FIG. 3. The IM server 105 then initiates the Spydonk process 140 for each of the user's networked devices. The Spydonk process 140 then waits for a request for output or a control command related to any of the user's networked devices. Selection by the user of the "Go Spydonk" button 380 automatically logs the user off from the IM server 105 and displays a "Go Seedonk" button 1210 in the user interface 1200 in a step 1140. Selection of the "Go Seedonk" button 1210 connects the user once more to the IM server 105.

Figure 13:
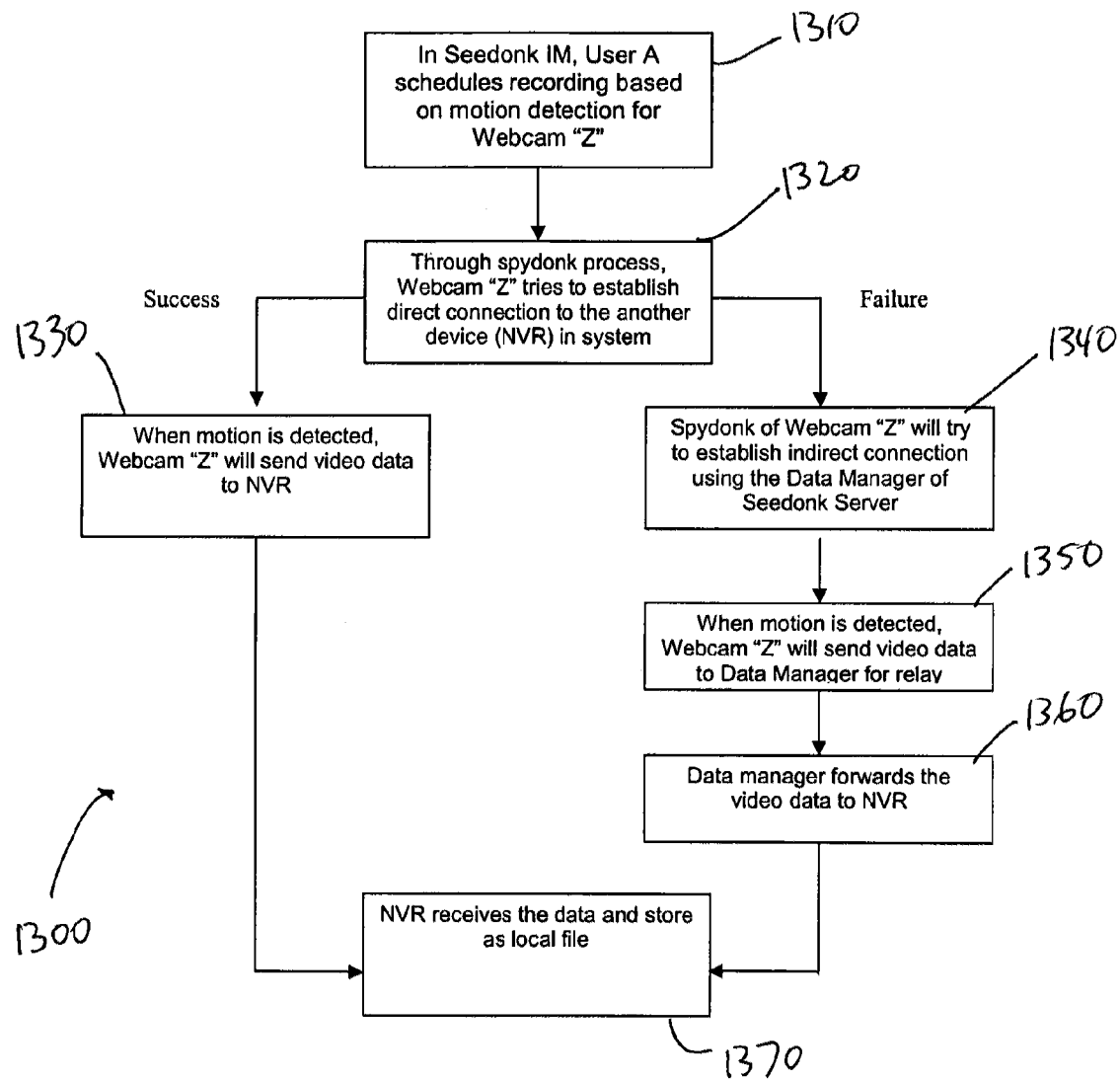
FIG. 13 is a flow chart illustrating an intra-device connection process in accordance with the invention.

With reference to FIG. 13, an intra-device connection process 1300 is illustrated. In a step 1310, a user (denoted user A in FIG. 13) may schedule a recording of the output of a networked device (denoted webcam Z in FIG. 13) based on motion detected by the networked device Z. In a step 1320, the Spydonk process 140 attempts to connect with the networked device Z. If the Spydonk process 140 successfully connects with the networked device Z, then in a step 1330 when motion is detected by the networked device Z, networked device Z sends its output to a NVR. In a step 1370 the NVR receives the output and stores the output locally. If the Spydonk process 140 is not successful in connecting with the networked device Z, then in a step 1340, the Spydonk process 140 attempts to establish an indirect connection with the networked device Z by means of the data manager 115. In a step 1350, when motion is detected by the networked device Z, networked device Z sends its output to the data manager 115. Then in a step 1360, the data manager 115 forwards the output to the NVR. In the step 1370 the NVR receives the output and stores the output locally.

The system and method for providing device management and sharing in an IM system in accordance with the invention allows for the assignment of a device identity such that the device can be accessed and managed outside of the IM session.

It is apparent that the above embodiments may be altered in many ways without departing from the scope of the invention. Further, various aspects of a particular embodiment may contain patentably subject matter without regard to other aspects of the same embodiment. Still further, various aspects of different embodiments can be combined together. Accordingly, the scope of the invention should be determined by the following claims and their legal equivalents.

What is claimed is:

1. A device management and sharing system for use in an instant messaging system comprising:
    an instant messenger server; and
    an enhanced instant messenger module operatively coupled to the instant messenger server, the enhanced instant messenger module having an instant messenger process and a networked device process, the instant messenger process being operable to provide instant messaging functions and services to a user and the networked device process being operable to provide data from networked devices to the instant messenger server, and wherein a user logs in to the instant messaging server and wherein the user may add another second user to a contact list and wherein the user selects a network device from a list of registered network devices and wherein access rights are granted allowing access to the selected registered network device so the second user is granted access rights to the networked device and may then view the networked device on a device list and may provide an input on a displayed icon of the networked device to request output of the networked device, and wherein a process running on the networked device sends the requested output to the instant messaging server from which the output is accessed.

2. The device of claim 1, wherein the instant messenger server comprises a data manager and the networked device process is operable to provide data from the networked device to the data manager.

3. The device of claim 1, wherein the networked device comprises a webcam coupled to a user's client machine, the client machine being operatively coupled to the instant messenger server.

4. The device of claim 1, wherein the networked device comprises a webcam.

5. The device of claim 1, wherein the networked device comprises a network video recorder.

6. The device of claim 1, wherein each networked device is associated with a list of users having access thereto.

7. The device of claim 1, wherein a user selection of the network device process is operable to end an instant messenger session and provide the instant messenger server with access to the user's networked devices.

8. The device of claim 1, wherein the network device process is operable to control the settings of the networked devices.

9. The device of claim 1, wherein the network device process is operable to control movement of the networked devices if the networked devices are moveable.

* * * * *